United States Patent [19]

Boryta et al.

[11] Patent Number: 4,543,525
[45] Date of Patent: Sep. 24, 1985

[54] METHOD FOR DETERMINING A LEAK IN A POND LINER OF ELECTRICALLY INSULATING SHEET MATERIAL

[75] Inventors: Daniel A. Boryta, Downingtown, Pa.; Misac N. Nabighian, Tucson, Ariz.

[73] Assignee: Foote Mineral Company, Exton, Pa.

[21] Appl. No.: 492,733

[22] Filed: May 9, 1983

[51] Int. Cl.⁴ ..................... G01R 31/08; G01R 31/12
[52] U.S. Cl. ..................................................... 324/54
[58] Field of Search ..................... 324/54, 51, 52, 352, 324/357

[56] References Cited

U.S. PATENT DOCUMENTS

| | | |
|---|---|---|
| 3,383,863 | 4/1968 | Berry . |
| 3,405,356 | 10/1968 | Hubby ................................. 324/54 |
| 3,800,217 | 3/1974 | Lowrance . |
| 4,101,827 | 7/1978 | Offner . |
| 4,404,516 | 9/1983 | Johnson ............................... 324/54 |

Primary Examiner—Stanley T. Krawczewicz
Assistant Examiner—Jose M. Solis
Attorney, Agent, or Firm—Howson and Howson

[57] ABSTRACT

The location of a leak in a pond liner made of a sheet of electrically insulating material, such a polyvinyl chloride, supported by an electrically conductive medium, an example of which is a salar, is determined by immersing a power electrode in an electrically conductive fluid within the pond and a second or ground electrode in the supporting medium and creating therewith an electric potential between the pond fluid and supporting medium. A detector, having a pair of spaced probe electrodes which are electrically connected, is introduced to the fluid near the power electrode with the ends of the probe electrodes adjacent the liner. The detector is rotated until a maximum current reading is obtained by a galvanometer electrically connected to the detector probes. With the probes so aligned with respect to the power electrode, the probes are cause to traverse the liner and the location of a leak is noted by a sharp change in the galvanometer reading as one of the probes passes over the leak.

18 Claims, 1 Drawing Figure

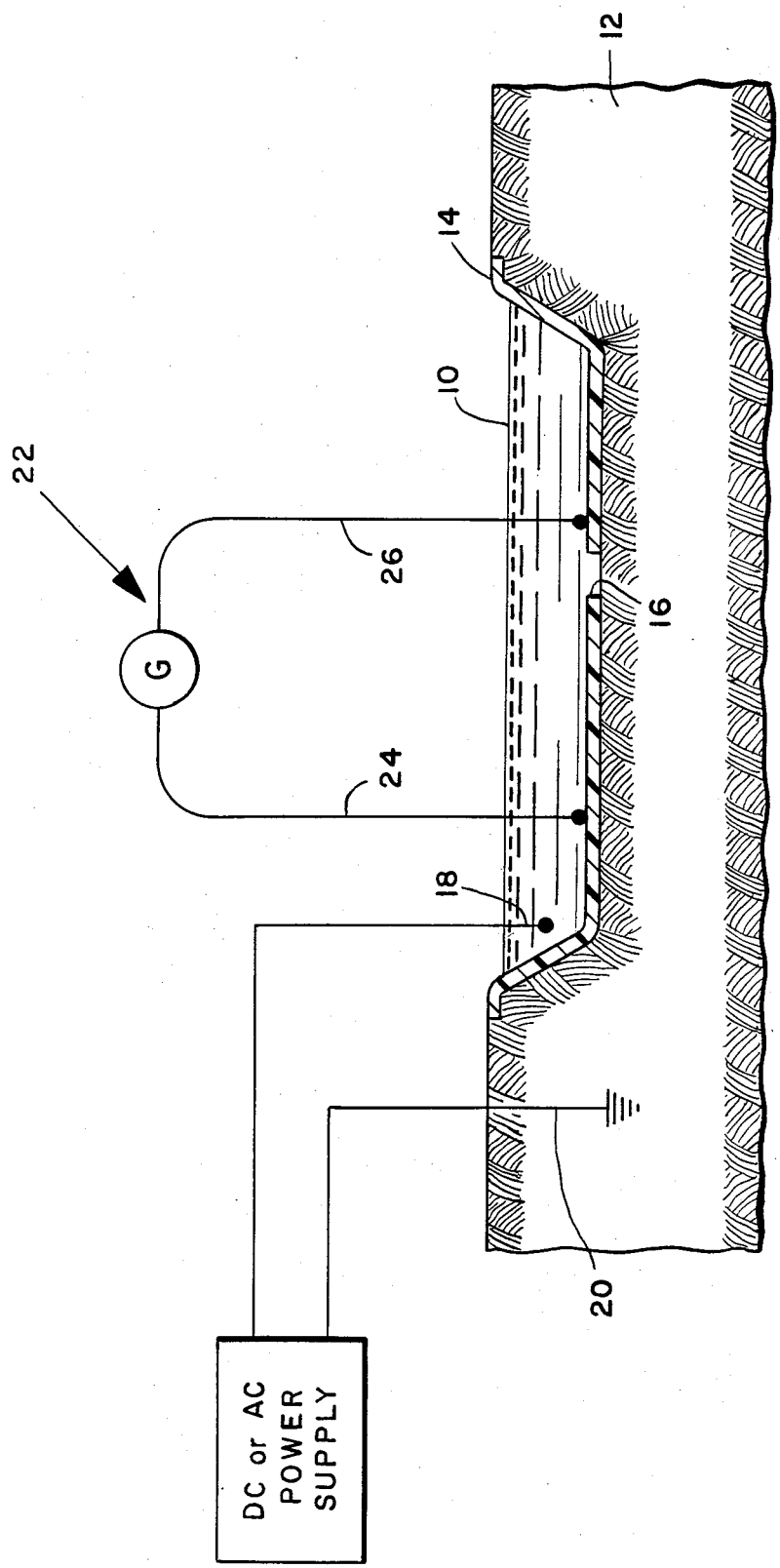

METHOD FOR DETERMINING A LEAK IN A POND LINER OF ELECTRICALLY INSULATING SHEET MATERIAL

DESCRIPTION

1. Field of invention

This invention relates to a novel method for detecting leaks in pond liners formed of electrically insulating sheet material.

2. Background of the invention

An important factor affecting the economics of solar evaporation ponds is pond leakage, resulting in loss of valuable product. Pond leakage is also an important aspect of hazardous waste impoundments where ground water supplies must be protected from contamination by the stored waste material. With the object of preventing such leakage, ponds have been lined with polymeric sheet material, an example of which is a thin (e.g. 0.05 mil) sheet of polyvinyl chloride (PVC). A particularly troublesome source of leaks are the seams where two sheets of polymeric material are joined together to form the pond liner. Prior to the present invention there were not available, at least on a commercial scale, reliable systems for determining the location of leaks in such pond liners.

It is a primary object of this invention to provide an improved method for detecting leaks in pond liners formed of electrically insulating sheet material.

Another object of this invention is the provision of a relatively simple method for determining the location of leaks in a pond liner composed of polymeric sheet material, which method employs relatively inexpensive equipment of simple design and construction.

These and other objects of this invention will become apparent from the following detailed description and accompanying drawing which is a schematic view illustrating one suitable form of electrical system of this invention wherein the leak in the pond liner is located by creating an DC potential by means of a pond electrode remote from the detector which comprises spaced electrically conductive probes connected to means, such as a microammeter, for measuring the current flowing through the probes.

DETAILED DESCRIPTION OF THE INVENTION

Broadly, the invention comprises providing a pond with a liner made of a sheet of electrically insulating material supported by a medium which is electrically conductive; introducing electrode means to the pond to establish an electric potential between an electrically conductive fluid within the pond and the supporting medium; introducing to the pond detector means comprising a pair of electrically connected, spaced, electrically conductive probes having associated therewith means for measuring the electric current flowing through the probes; aligning the probes with respect to the electrode means to obtain a maximum current reading by the current measuring means, and causing the probes of the detector means to traverse over the bottom of the pond adjacent the liner in a direction away from said electrode means until a point is reached where the current substantially changes in value and which thereby is indicative of the leak location beneath one of said probes.

Referring to the drawing in detail, which is a schematic view illustrating one suitable electrical apparatus by which the method of the present invention may be carried out, and wherein the location of a leak in a pond liner is located by passing a leak detector over the leak, it may be seen that a pond 10 is formed in the soil 12. The pond may be formed by any suitable method as for example by use of conventional earthworking equipment. The pond 10 contains a electrically conductive fluid, such as salt brine, and is provided with liner 14, the purpose of which is to prevent the fluid in the pond from soaking into the soil beneath the pond. The liner generally will comprise a sheet of polymeric material which is electrically insulating, such as polyvinyl chloride, having a thickness on the order of about 20 to 80 mils. Inasmuch as ponds designed for the evaporation of brines may be several acres in size, the liners therefor ordinarily will be comprised of a number of strips of polymeric sheet material bonded together in an overlapping relation along their adjacent longitudinal edges. As noted previously, it is these seams which are a particularly annoying source of leaks. In the drawing a leak in the liner 14 is designated by the numeral 16.

A particularly preferred leak detection system and method of this invention which will now be described is particularly useful in searching out liner leaks in large ponds covering several acres. More particularly, in the preferred system, the electric potential between the electrically conductive fluid in the pond and the ground is obtained using an AC or DC source of electricity connected to an electrode 18 which is in contact with the pond fluid and a ground electrode 20. Thus, it can be seen that the power source for creating such electric potential is remote as regards the detector 22 which will now be described.

The leak detector 22 illustrated in the drawing preferably comprises two spaced electrically conductive probes 24, 26 which are electrically connected to each other through a galvanometer "G" which may be a microammeter or millivolt meter. In the drawing, the probes are illustrated as extending vertically into the pond, and their respective longitudinal axes are substantially parallel. Of course, other arrangements of the probes can be used provided the probes extend into the pond fluid so that the exposed ends thereof are adjacent the pond liner. The probes are preferably of heavy copper wire or tubing covered with electrically insulating material except for the ends which are in contact with the conductive fluid. The spacing between the exposed ends of the probes should be one or more feet, preferably as much as six or more feet, to provide the detector with the desired sensitivity. Also, the ends of the probes should be rounded and free of sharp edges to prevent tearing of the liner.

In use, an electric potential is created between the conductive fluid in the pond and ground. The probes 24, 26 of the leak detector 22 are inserted in the conductive fluid of the pond near the electrode 18, and the detector is slowly rotated while changes in the reading of the galvanometer "G" are noted. When the probes 24, 26 are in electrical series with the power electrode 18 and the leak 16, which alignment produces the maximum current flowing through the probes, the detector, with the probes adjacent the pond liner, is moved away from the power electrode toward the leak whose location is indicated by a substantial change in the galvanometer reading as one of the probes pases over the leak. By moving the detector back and forth in the leak area, the exact location of the leak as lying beneath a particular probe can be determined.

The following example illustrates further the methods and systems of this invention.

EXAMPLE I

The purpose of this test was to determine if a leak could be detected in a pond liner located on a typical salar bottom, i.e. a salt-encrusted depression that may be the basin of an evaporated lake where saline waters exist close to the surface.

A test pond was constructed having an inside dimension of 7 meters by 16 meters. The pond bottom which supported the liner consisted of 12.7 cm (5 in.) of compacted burrow clay over 5 cm (2 in.) of berm fines covering crushed and leveled salar salt. The salar brine was about 46 cm. below the surface of the crushed salt. This brine in the salt matrix was about as conductive as a saturated salt solution. The compacted clay had a permeability of $10^{-7}$ to $10^{-8}$ cm/sec. The berm was constructed with the same fines used to construct the berms for production ponds and measured about 30 cm high by 1.5 M wide at the base. The inside of the berm had a 1 to 1 slope. The pond liner comprised a sheet of 20 mil polyvinyl chloride.

A ground electrode was inserted 1.5 meters into the salar at a distance of about 150 meters from the pond. A second electrode comprising a 30 cm by 1.3 cm diameter pipe was placed in the pond near an edge of the of the pond, and the electrodes were connected to variable voltage power supplies, both AC and DC. Tests were conducted at 12 and 30 volts.

The leak detector was fabricated from a piece of PVC pipe to which two probes or electrodes were attached so that the exposed ends thereof in contact with the brine were at a distance of about 5 feet from each other. The electrodes comprised ¼ in. copper tubing insulated along its length with plastic insulation. The electrode ends that were submerged were free of insulation and coiled up to avoid puncturing the PVC liner. A ±25 microampere meter was mounted on the PVC pipe which acted as a handle and the meter was connected to the two electrodes. Switches were installed on the meter to either shunt the galvanometer or to select 0 and 10 K resistance in series with the electrodes.

The pond was filled with a lithium chloride brine.

A 2.5 cm. cut ("leak 1") was made in the liner without observation of the operator of the leak detector. The current to the pond from the power supply immediately increased from 1.0 amp to 1.3 amps at 30 v. DC and from 1.0 amp to 1.8 amps at 30 v. AC.

Scanning the pond with the detector and DC current, the general location of leak 1 was found within one minute and the exact location thereof within another minute. A millivolt digital multimeter was also successfully tested using a 30 v. AC power source.

A second cut was made ("leak 2") without observation by the detector operator. The amperage increased from 1.3 to 1.6 amps at 30 v. DC and from 1.8 to 2.8 amps at 30 v. AC.

Using DC current, the detector indicated that there was a leak between leaks 1 and 2. Upon scanning the pond away from leak 1, leak 2 became apparent by a deflection on the galvanometer. Once the galvanometer deflection and direction was observed (about 1 to 2 meters away from the leak), the second leak was approached and located.

Based on tests as described in Example I, it was determined that sensitivity of the detector for determining the direction toward a leak increased with increased applied voltage. However, a maximum potential of 30 volts was used in order to avoid creating possibly hazardous working conditions. Voltages somewhat greater than this amount may be used, bearing in mind the safety of the employees.

Large distances between the injection or power electrode immersed in the pond fluid and a leak, and the presence of multiple leaks, results in less current per leak and, therefore, a decrease in the sensitivity of the detector. In order to maintain relatively high sensitivity, positioning of the power electrode within about 30 meters of the operating area of the detector is recommended.

Prior to using the detector, the presence or absence of any leaks should be determined, for the ability to determine the location of a leak in the liner depends upon achieving electrical continuity from ground to the electrically conductive fluid, e.g. brine, in the pond through the leak. The liner acts as an insulator, and in the case of PVC, the volume resistivity is $2.06 \times 10^{11}$ ohms. By appropriate calculations it was determined that for a six acre liner 0.05 cm thick, the potential across the liner thickness with application of 30 v. DC to the fluid is about 0.7 amps. Of course, larger ponds will conduct current proportional to the pond area. Thus, if a current greater than 0.7 amps at 30 v. DC is noted in the six acre liner, a leak should be suspected.

The method of this invention is particularly useful in detecting leaks in liner seams. Such leaks may be located by observing a sharp change in the detector galvanometer reading. The spaced probes of the detector are immersed in the brine so that the exposed ends thereof are on a seam, and the detector is caused to traverse along the seam away from the power electrode which is immersed in the pond fluid at the end of the seam being checked for leaks. Thus, the detector is in electrical series with the power electrode and any leak in the liner seam.

As can be seen from the foregoing description, the present invention provides a directional system for locating leaks in pond liners of substantially electrically non-conductive material. Although the detector herein described is of the type which can be hand held, for very large ponds extending over several acres, a detector in the form of a tripod supported by wheels can be used. Such mobile detector could be provided with appropriate means for pulling or pushing the detector across the pond.

Although the invention has been described in detail in connection with locating leaks in pond liners, it can be used for other purposes. For example, the invention can be utilized to advantage in locating leaks in large flat roofs. A grounding electrode may be attached to the reinforcing steel rods in the concrete which supports the roof, the rods rendering the concrete electrically conductive. Ordinarily, the roof will have a layer of sheet material which is not only waterproof but substantially electrically insulating, e.g. asphalt or asphalt impregnated felt. The waterproof layer will have a peripheral portion which extends vertically upwardly so as to define a shallow reservoir. The roof will also be provided with one or more drains. To locate a leak in the waterproof layer, the drains are plugged and the roof is flooded with an electrically conductive fluid such as salt water to a depth of several inches. An electric potential is established between the fluid and the metal reinforced concrete supporting structure and the probed is used to locate leaks in the same manner as described hereinabove in locating leaks in a pond.

We claim:

1. The method for determining the location of a leak in a pond liner made of a sheet of electrically insulating material supported by a medium which is electrically conductive which comprises the steps of:

introducing a single power electrode to said pond at a predetermined location and establishing therewith an electric potential between an electrically conductive fluid within said pond and said supporting medium, introducing to said pond detector means comprising a pair of electrically connected, spaced, electrically conductive probes, while maintaining said power electrode at said predetermined location aligning said probes to obtain a maximum flow of current through said probes, and while maintaining said alignment of said probes causing the probes of said detector means to traverse over the bottom of said pond adjacent said liner until a point is reached where the current substantially changes in value and which thereby is indicative of the leak location.

2. The method of claim 1 in which there is associated with said detector means electric current measuring means for measuring the electric current flowing through said probes.

3. The method of claim 1 in which a direct current electric potential not exceeding about 30 volts is established between said fluid and said supporting medium.

4. The method of claim 1 in which an alternating current electric potential not exceeding about 30 volts is established between said fluid and said supporting medium.

5. The method of claim 1 in which the distance between said probes is from about 1 to about 6 feet, and said probes extend downwardly into the pond.

6. The method of determining the location of a leak in a pond liner made of a sheet of electrically insulating material supported by a medium which is electrically conductive which comprises the steps of:

introducing a single power electrode to said pond at a predetermined location and establishing therewith an electric potential between an electrically conductive fluid within said pond and said supporting medium, introducing to said pond detector means comprising a pair of electrically connected, spaced, electrically conductive probes having associated therewith means for measuring the electric current flowing through said probes, while maintaining said power electrode at said predetermined location rotating said detector means to a position which produces a maximum current reading by said current measuring means, and causing the probes of said detector means to traverse over the bottom of said pond adjacent said liner in a direction away from said power electrode while maintaining the relative position of said probes with respect to said power electrode to maintain a maximum flow of current through said probes until a point is reached during said traverse where the current substantially changes in value and which thereby is indicative of the leak location.

7. The method of claim 6 in which a direct current electric potential not exceeding about 30 volts is established between said fluid and said supporting medium.

8. The method of claim 6 in which an alternating current electric potential not exceeding about 30 volts is established between said fluid and said supporting medium.

9. The method of claim 6 in which the distance between said probes is from about 1 to about 6 feet, and said probes extend substantially vertically into the pond.

10. The method of determining the unknown location of a leak in a pond liner made of a sheet of electrically insulating material supported by an electrically conductive medium comprising the steps of:

energizing the pond by applying a voltage source to a single power electrode immersed in an electrically conductive fluid in the pond at a well-defined location therein, and a ground electrode connected to the supporting medium, whereby there is established within said fluid an electric field having a substantial horizontal component directed along a path between the unknown location of the leak and the power electrode;

immersing in said fluid detector means comprising electrically connected spaced probe electrodes having connected thereto current measuring means for measuring the current flowing through said probe electrodes, rotating said detector means to orient said probe electrodes in an imaginary horizontal line between said power electrode and said leak as indicated by a maximum reading on the current measuring means, and then, without substantially changing the orientation of said detector means with respect to said power electrode, moving said probe electrodes along a radial path extending horizontally from said well-defined location at which the power electrode is connected to the fluid, while measuring the magnitude of the electric field gradient within said fluid, and locating a point within said fluid at which the traversing movement of the detector means results in the largest change in the magnitude of the measured electric field gradient, said point being the determined location of the leak.

11. The method according to claim 10 in which the detector rotation step is carried out with the detector means near said well-defined location of said power electrode, and the detector movement step is carried out by moving said detector away from said well-defined location along said radial path.

12. Means for determining the location of a leak in a pond liner made of a sheet of electrically insulating material supported by a medium which is electrically conductive which comprises:

a single power electrode immersed in electrically conductive fluid within said pond at a predetermined location, a ground electrode connected to said electrically conductive supporting medium, a source of voltage connected between said power and ground electrodes, and leak detector means comprising a pair of electrically connected spaced, electricaly conductive probes having associated therewith means for measuring the electric current flowing through said probes, said detector means being rotatable to cause said probes to change position relative to said power electrode and being capable of traversing over bottom of said pond with said probes immersed in said fluid adjacent said pond liner.

13. Means according to claim 12 in which the distance between said probes is from about 1 to about 6 feet, and said probes extend downwardly into said pond.

14. The method of determining the location of a leak in a layer of electrically insulating material, said layer having a configuration enabling it to act as a relatively flat reservoir for a fluid so that said fluid has a horizontal surface exposed to the atmosphere, said insulating material being supported by an electrically conductive medium which comprises the steps of:
   introducing an electrically conductive fluid to said reservoir,
   introducing a single power electrode to said fluid at a predetermined location and establishing therewith an electric potential between said fluid and said supporting medium,
   introducing to said reservoir detector means comprising a pair of electrically connected, spaced, electrically conductive probes,
   while maintaining said power electrode at said predetermined location aligning said probes to obtain a maximum flow of current through said probes, and
   while maintaining said alignment of said probes causing said probes to traverse over the bottom of said reservoir adjacent said electrically insulating layer material until a point is reached where the current substantially changes in value and which thereby is indicative of the leak location.

15. The method of claim 14 in which there is associated with said detector means electric current measuring means for measuring the electric current flowing through said probes.

16. The method of claim 14 in which a direct current electric potential not exceeding about 30 volts is established between said fluid and said supporting medium.

17. The method of claim 14 in which an alternating current electric potential not exceeding about 30 volts is established between said fluid and said supporting medium.

18. The method of claim 14 in which the distance between said probes is from about 1 to about 6 feet, and said probes extend downwardly into the reservoir.

* * * * *